United States Patent
Murphy

(10) Patent No.: US 6,987,229 B2
(45) Date of Patent: Jan. 17, 2006

(54) FRAME-BASED OCCUPANT WEIGHT ESTIMATION APPARATUS HAVING COMPLIANT LINKAGE ASSEMBLY

(75) Inventor: Morgan D. Murphy, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 154 days.

(21) Appl. No.: 10/618,905

(22) Filed: Jul. 14, 2003

(65) Prior Publication Data

US 2005/0011682 A1   Jan. 20, 2005

(51) Int. Cl.
*B60R 21/22* (2006.01)
*G01G 19/52* (2006.01)

(52) U.S. Cl. .................. 177/144; 180/273; 280/735; 73/768; 73/775

(58) Field of Classification Search ........... 177/136, 177/144, 210 R, DIG. 9; 180/273; 280/735; 701/45; 73/768, 774, 775
See application file for complete search history.

(56) References Cited

U.S. PATENT DOCUMENTS

| | | | |
|---|---|---|---|
| 5,474,327 A | 12/1995 | Schousek | 280/735 |
| 5,942,695 A | 8/1999 | Verma et al. | 73/768 |
| 5,987,370 A | 11/1999 | Murphey et al. | 701/45 |
| 6,012,007 A | 1/2000 | Fortune et al. | 701/45 |
| 6,058,341 A | 5/2000 | Myers et al. | 701/45 |
| 6,069,325 A * | 5/2000 | Aoki | 177/136 |
| 6,101,436 A | 8/2000 | Fortune et al. | 701/45 |
| 6,138,067 A | 10/2000 | Cobb et al. | 701/45 |
| 6,246,936 B1 | 6/2001 | Murphy et al. | 701/45 |
| 6,360,618 B2 | 3/2002 | Anahid et al. | 73/862.627 |
| 6,424,898 B2 | 7/2002 | Anishetty et al. | 701/45 |
| 6,438,476 B1 | 8/2002 | Gray et al. | 701/45 |
| 6,438,477 B1 | 8/2002 | Patterson et al. | 701/45 |
| 6,448,512 B1 * | 9/2002 | Cooper | 177/144 |
| 6,479,776 B2 | 11/2002 | Nakase et al. | 200/559 |
| 6,542,802 B2 | 4/2003 | Gray et al. | 701/45 |
| 6,578,871 B2 | 6/2003 | Gray et al. | 280/735 |
| 6,587,770 B1 | 7/2003 | Gray et al. | 701/45 |
| 6,903,280 B2 * | 6/2005 | Selig et al. | 177/144 |

* cited by examiner

*Primary Examiner*—Randy W. Gibson
(74) *Attorney, Agent, or Firm*—Stefan V. Chmielewski

(57) ABSTRACT

A frame-based occupant weight estimation apparatus for a vehicle seat includes a compliant linkage assembly that translates vertically applied seat loads to a horizontal plane, where the horizontal forces are measured by a set of force sensors. A compliant member, which may be a spring or a linkage arm, preloads the force sensors to enable off-loading detection, and an overload device securely anchors the seat to the vehicle floor without interfering with normal load measurement.

12 Claims, 3 Drawing Sheets

FRAME-BASED OCCUPANT WEIGHT ESTIMATION APPARATUS HAVING COMPLIANT LINKAGE ASSEMBLY

TECHNICAL FIELD

This invention is directed to apparatus for detecting the weight of an occupant of a motor vehicle seat for purposes of determining whether and how forcefully to deploy supplemental restraints, and more particularly to apparatus for measuring forces applied to a frame of the vehicle seat.

BACKGROUND OF THE INVENTION

Vehicle occupant detection systems are useful in connection with air bags and other pyrotechnically deployed restraints as a means of judging whether, and how forcefully, to deploy the restraint. One fundamental parameter in this regard is the weight of the occupant, as weight may be used as a criterion to distinguish between an adult and an infant or small child.

Most prior weight estimation techniques involve installing a pressure sensitive element such as a variable resistance pad or a fluid filled bladder in or under a vehicle seat cushion, and utilizing the pressure measurement as an indication of occupant weight. See, for example, the U.S. Pat. Nos. 5,474,327, 5,987,370, 6,246,936, 6,101,436 and 6,490,936, assigned to the assignee of the present invention and incorporated by reference herein.

Alternatively, the occupant weight may be measured with one or more load cells that sense the forces (strain or pressure) that the seat applies to a bracket that supports the seat on the vehicle floor. See, for example, the Publication Nos. 41520, 41542, 41549 and 41559 from the November, 1998 issue of Research Disclosure. Since the "frame-based" load cell configurations become part of the supporting structure of the seat, they tend to be relatively bulky and/or expensive to produce. Accordingly, what is needed is a frame-based occupant weight estimation apparatus that is simple and inexpensive to produce, and that does not compromise the structural integrity of the seat.

SUMMARY OF THE INVENTION

The present invention is directed to an improved frame-based occupant weight estimation apparatus for a vehicle seat, including compliant linkage assemblies interposed between the seat frame and floor brackets bolted to the vehicle floor. The compliant linkage assemblies translate vertically applied seat loads to a horizontal plane (that is, parallel to the vehicle floor), where the horizontal forces are measured by a set of force sensors. In each assembly, a compliant member, which may a spring or a linkage arm, preloads the force sensor to enable off-loading detection, and an overload device securely anchors the seat to the floor bracket without interfering with normal load measurement.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
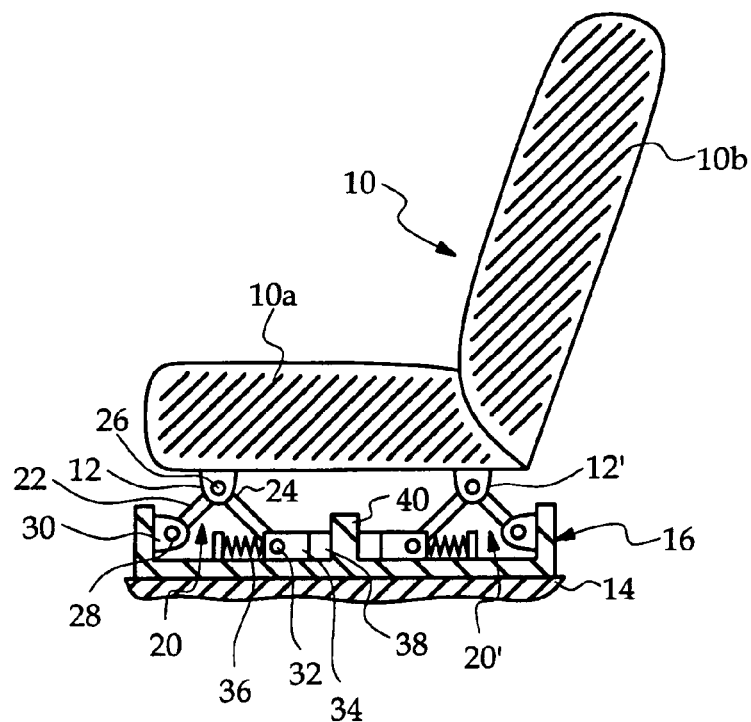
FIG. 1 is a side-view diagram of a vehicle seat incorporating the frame-based occupant weight estimation apparatus of the present invention.
Figure 2:
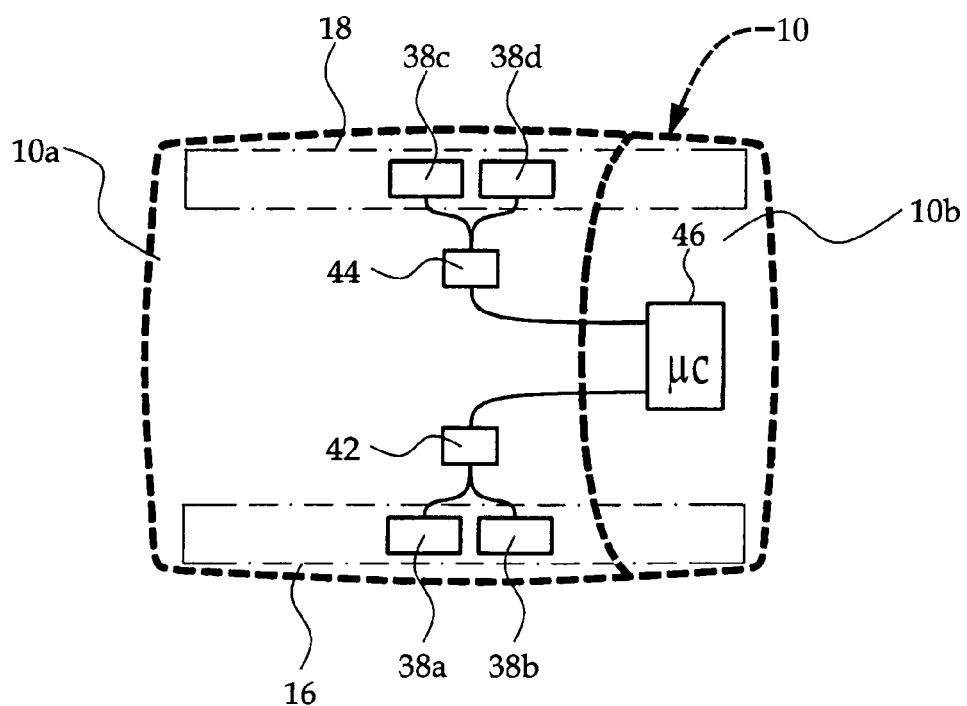
FIG. 2 is a diagram of the electrical components of the apparatus of FIG. 1.

Referring to the drawings, and particularly to FIGS. 1 and 2, the reference numeral 10 generally designates a vehicle seat, including seat and backrest cushions 10a, 10b supported on a frame including a set of mounting brackets 12. The seat 10 is secured to the vehicle floor 14 by a pair of laterally spaced floor brackets 16, 18 that are bolted to floor 14, and a set of linkage assemblies 20 are interposed between the seat frame mounting brackets 12 and the floor brackets 16, 18 for supporting the seat 10 and estimating the weight of a seat occupant. In the illustrated embodiment, there are four seat mounting brackets (left front, right front, left rear and right rear) and four associated linkage assemblies, but only the left-front and left-rear seat mounting brackets 12, 12' and the left-front and left-rear linkage mechanisms 20, 20' are visible in the drawings. As indicated in FIG. 1, the front and rear linkage assemblies 20, 20' are mirror image but otherwise identical. Accordingly, the following description of the linkage assembly 20 applies equally to linkage assembly 20' as well as the right-front and right-rear linkage assemblies.

The linkage assembly 20 includes first and second linkage arms 22 and 24 rotatably coupled at one end to a pin 26 secured to the seat frame mounting bracket 12. The other end of arm 22 is rotatably coupled to a pin 28 secured in a mounting bracket 30 of floor bracket 16, and the other end of arm 24 is rotatably coupled to a pin 32 secured to a slider block 34 that is supported on the base of floor bracket 16 for linear movement substantially parallel to the vehicle floor. The weight of the seat 10 and a spring 36 bias the slider block 34 into engagement with a force sensor 38 which is disposed between slider block 34 and a central post 40 of floor bracket 16. The force sensor 38 may be a strain gauge device or load cell such as those produced and sold by Panasonic Corporation or Texas Instruments Corporation, and produces an electrical output signal functionally related to the force applied to it by slider block 34.

The bias or preload force applied to force sensor 38 is particularly important in frame-based occupant weight estimation because it enables off-loading detection. This can occur, for example, when the occupant leans back in the seat 10, reducing the force measured by the linkage assemblies coupled to mounting brackets on the front of the seat 10. Due to the preload force, such off-loading can be measured and taken into consideration in the weight estimation calculations.

FIG. 2 depicts the force sensor layout for the embodiment of FIG. 1, with the force sensors 38a and 38b being disposed in the floor bracket 16, and the force sensors 38c and 38d being disposed in the floor bracket 18. The co-located sensors 38a, 38b are electrically coupled to a first connector 42, while the co-located sensors 38c, 38d are electrically coupled to a second connector 44. The connectors 42 and 44, in turn are electrically coupled to a microcontroller (uC) 46, which may be located beneath the seat 10 as shown or at a remote location. The microcontroller 46 processes the output signals produced by the sensors 38a, 38b, 38c, 38d to determine corresponding weights attributable to a seat occupant, and sums the weights to determine the occupant weight or weight classification for purposes of deciding whether and how forcefully to deploy supplemental restraints designed to protect the occupant from serious injury in a crash event.

Figure 3:
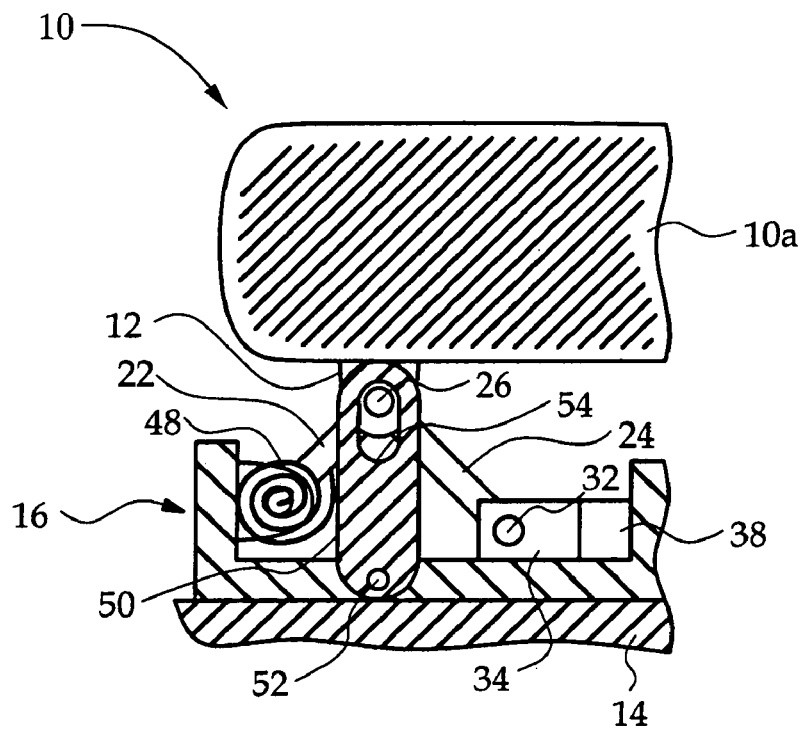
FIG. 3 depicts a first alternate linkage assembly for the apparatus of FIG. 1.

FIG. 3 depicts an alternate embodiment in which a spiral torsion spring 48 is used in place of the linear coil spring 36 of FIG. 1. In this case, the spring 48 imparts a moment to the arm 22 which tends to make the arms 22 and 24 co-linear. Additionally, FIG. 3 depicts an overload plate 50 for limiting upward movement of the seat 10a with respect to the floor brackets 16, 18 in the event of a crash. Of course, overload plates 50 are preferably installed at each of the four seat frame mounting brackets 12, 12'. The plate 50 is anchored on a post 52 formed on floor bracket 16, and has an elongated aperture 54 through which the pin 26 extends. The pin 26 does not contact the plate 50 in normal operation, but contacts the plate 50 when a strong upward force is applied to seat 10. The plate 50 is applicable to each of the various embodiments depicted herein, but has been omitted from the other embodiments so as not to obscure the linkage mechanism elements.

Figure 4:
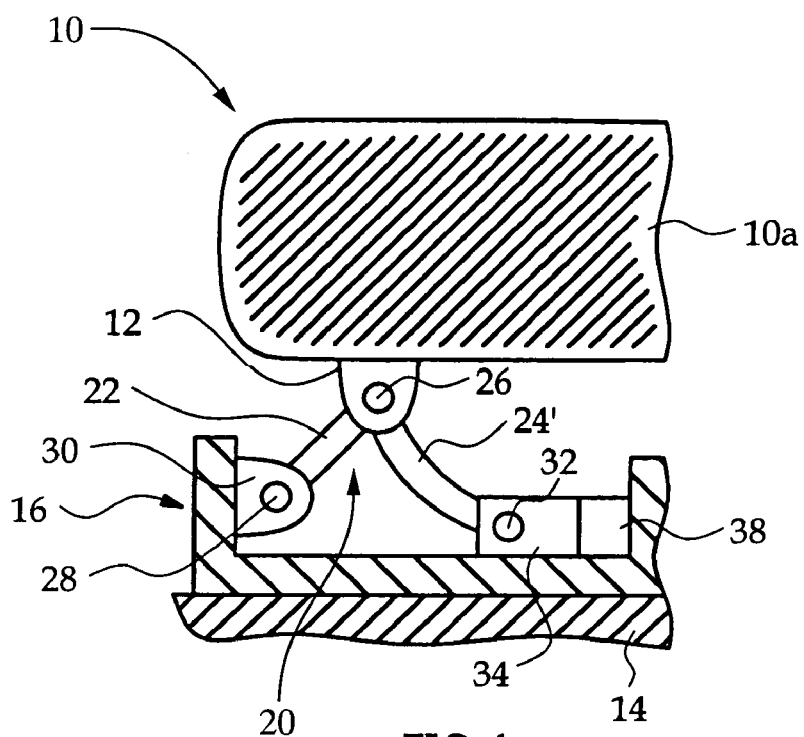
FIG. 4 depicts a second alternate linkage assembly for the apparatus of FIG. 1.

FIG. 4 depicts an alternate embodiment in which the arm 24' of linkage assembly 20 is compliant instead of rigid. In this case, the arm 24' biases the slider block 34 against the sensor 38, and no external spring is required. Also, the arm 22 could be compliant instead of, or in addition to, the arm 24', if desired.

Figure 5:
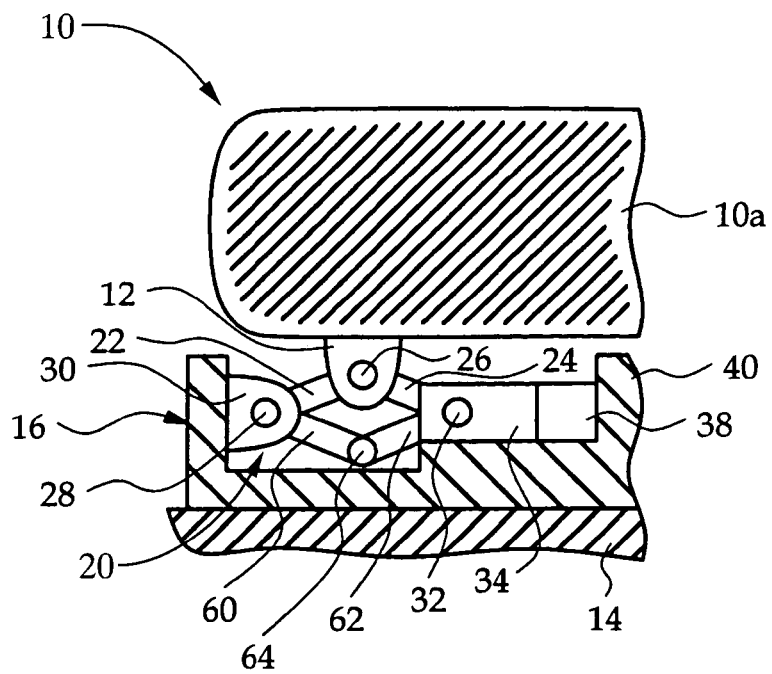
FIG. 5 depicts a third alternate linkage assembly for the apparatus of FIG. 1.

FIG. 5 depicts an alternate embodiment in which the linkage assembly 20 includes two additional arms 60 and 62. The arms 60 and 62 are rotatably co-joined at pin 64, the arm 60 also being rotatably coupled to the pin 28 of floor bracket 16, and the arm 62 also being rotatably coupled to the pin 32 of slider block 34. This arrangement requires additional space under the seat 10, but reduces frictional losses. As with the other embodiments, one or more of the bars/arms 22, 24, 60, 62 can be compliant to provide the desired bias or preload on sensor 38, or the bias can be provided by an external spring as shown in FIGS. 1 and 3.

Figure 6:
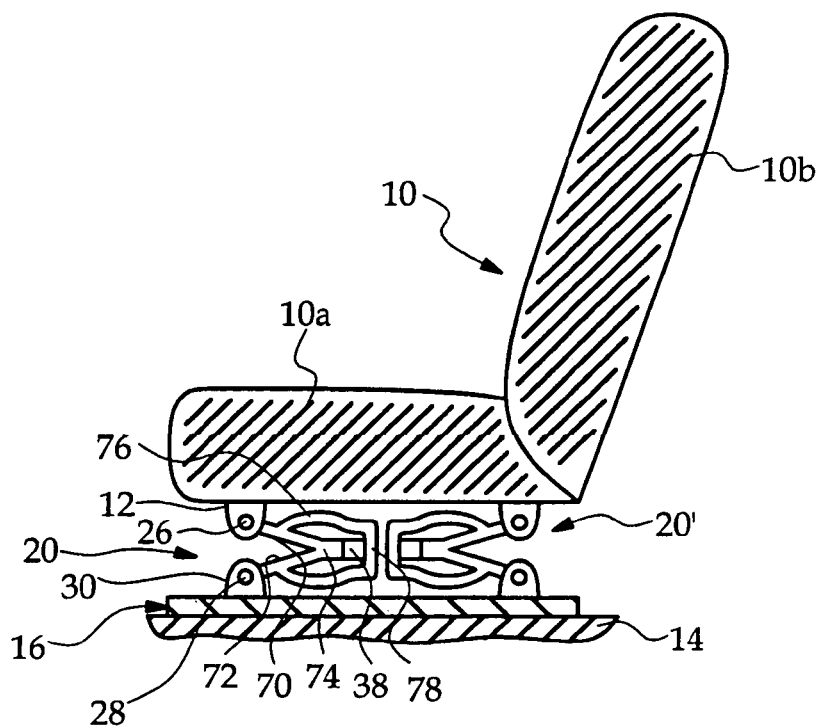
FIG. 6 depicts a fourth alternate linkage assembly for the apparatus of FIG. 1.

Finally, FIG. 6 depicts an alternate embodiment in which the linkage assembly 20 is a compliant one-piece device that applies a compressive force to the sensor 38 in relation to occupant weight. The device 20 includes first and second lever arms 70 and 72 rotatably coupled to the pins 26 and 28 of seat frame mounting bracket 12 and floor bracket 16. The lever arms 70 and 72 are joined at a fulcrum which defines the slider block 74, and a circumferential arm 76 joined to the lever arms 70 and 72 provides a reaction surface 78 for the force sensor 38.

In summary, the present invention provides a seat frame-based occupant weight estimation apparatus including a compliant linkage assembly that translates vertical force associated with occupant weight to a horizontal force that is sensed by a pre-loaded force sensor. The several different embodiments each include a linkage mechanism coupling the seat mounting bracket to a floor bracket, and an overload mechanism for limiting upward movement of the seat with respect to the floor bracket. Each linkage assembly includes a slider block that exerts a compressive force on the respective force sensor, and the sum of the measured forces is indicative of occupant weight.

Advantageously, the linkage assemblies depicted in FIGS. 1, 3, 4 and 5 can be configured in accordance with the teachings of U.S. Pat. No. 5,649,454, co-assigned to Purdue Research Foundation and the assignee of the present invention and incorporated by reference herein, so that the preload force applied to sensor 38 is substantially constant. This can be particularly significant in an automotive environment, as the preload bias force would otherwise vary as the linkage arms expand and contract with changes in the passenger compartment temperature. Essentially, the bias force exerted by the spring 36 or 48, or by the compliant linkage arm 24' should be designed to have a null (i.e., zero bias force) condition when the linkage arms 22, 24 are collinear with the path of movement of slider block 34, and the length of the linkage arms should be designed so that the bias force is substantially constant for any position of the arms 22, 24. A detailed description of the linkage arm dimensional considerations is set forth in the aforementioned U.S. Pat. No. 5,649,454, which is incorporated by reference herein.

While illustrated in respect to the illustrated embodiments, it will be recognized that various modifications in addition to those mentioned above may occur to those skilled in the art. For example, the seat 10 may be supported by a greater or lesser number of linkage assemblies, the linkage assemblies may be oriented laterally with respect to the seat 10, and so on. Accordingly, it will be understood that devices incorporating these and other modifications may fall within the scope of this invention, which is defined by the appended claims.

What is claimed is:

1. Apparatus for estimating the weight of an occupant of a vehicle seat supported by a floor bracket mounted on a vehicle floor, the apparatus comprising:
   a force sensor; and
   a compliant linkage assembly interposed between said floor bracket and a mounting bracket of said seat, including linkage arms rotatably coupled to said floor bracket and said mounting bracket, a slider member supported for linear movement substantially parallel to said vehicle floor, and means for biasing said slider member into engagement with said force sensor, said linkage arms being coupled to said slider member such that occupant weight applied to said seat produces linear movement of said slider member that increases an engagement force between said slider member and said force sensor, whereby said force sensor produces an output signal indicative of said occupant weight.

2. The apparatus of claim 1, wherein said means for biasing said slider member into engagement with said force sensor includes a spring.

3. The apparatus of claim 2, wherein said spring is a coil spring that exerts-a linear bias force substantially parallel to said vehicle floor.

4. The apparatus of claim 2, wherein said spring is a torsion spring coupled to at least one of said linkage arms.

5. The apparatus of claim 1, wherein said linkage arms include a first arm coupled between said seat mounting bracket and said floor bracket and a second arm coupled between said seat mounting bracket and said slider member, and the means for biasing said slider member into engagement with said force sensor also biases said first and second arms to be collinear with the linear movement of said slider.

6. The apparatus of claim 5, wherein the means for biasing said slider member into engagement with said force sensor has a null condition when the linkage arms are collinear with the linear movement of said slider, and the linkage arms have lengths such that said bias force is substantially constant for any position of said linkage arms.

7. The apparatus of claim 1, wherein said linkage arms include a first arm coupled between said seat mounting bracket and said floor bracket and a second arm coupled between said seat mounting bracket and said slider member, and at least one of said first and second linkage arms are compliant for biasing said slider member into engagement with said force sensor.

8. The apparatus of claim 1, wherein said linkage assembly includes overload means for anchoring said seat to said floor bracket to prevent said seat from becoming detached from said floor bracket.

9. The apparatus of claim 1, wherein said linkage arms include a first arm coupled between said seat mounting bracket and said floor bracket, a second arm coupled between said seat mounting bracket and said slider member, and third and fourth co-joined arms coupled between said floor bracket and said slider member.

10. The apparatus of claim 1, wherein said linkage assembly is defined by a compliant device including first and second lever arms rotatably coupled to said seat mounting bracket and said floor bracket, where said lever arms are joined at a fulcrum that defines said slider block.

11. The apparatus of claim 10, wherein said compliant device includes a circumferential arm joining the first and second lever arms to a reaction surface for said force sensor.

12. The apparatus of claim 1, wherein said seat includes a set of mounting brackets, and the apparatus includes a force sensor and compliant linkage assembly for each such seat mounting bracket, and the force sensors are co-located in pairs to facilitate electrical connections to the force sensors.

* * * * *